United States Patent
Bienvenu et al.

(10) Patent No.: US 7,673,557 B2
(45) Date of Patent: Mar. 9, 2010

(54) COFFEEMAKER HAVING SEVERAL INFUSION HEADS

(75) Inventors: Denis Bienvenu, Saint Pierre des Nids (FR); Frédéric Hiron, Saint Ouen de Mimbre (FR)

(73) Assignee: SEB, S.A., Ecully (FR)

( * ) Notice: Subject to any disclaimer, the term of this patent is extended or adjusted under 35 U.S.C. 154(b) by 850 days.

(21) Appl. No.: 11/415,105

(22) Filed: May 2, 2006

(65) Prior Publication Data
US 2006/0249030 A1    Nov. 9, 2006

(30) Foreign Application Priority Data
May 4, 2005    (FR) .................................. 05 04570

(51) Int. Cl.
*A47J 31/00*    (2006.01)
(52) U.S. Cl. .............................. 99/291; 99/290; 99/300; 99/302 R
(58) Field of Classification Search ........... 99/280–283, 99/287–303, 302 R, 307
See application file for complete search history.

(56) References Cited

U.S. PATENT DOCUMENTS

| | | | |
|---|---|---|---|
| 3,824,914 A * | 7/1974 | Casiano .................... 99/302 R |
| 5,259,297 A | 11/1993 | Giuliano | |
| 5,408,917 A | 4/1995 | Lüssi | |
| 5,813,318 A | 9/1998 | Zanin et al. | |
| 5,896,806 A * | 4/1999 | Dal Tio .................... 99/289 T |
| 5,970,848 A * | 10/1999 | Pelech et al. .................. 99/291 |
| 6,829,981 B2 * | 12/2004 | Lassota ....................... 99/299 |
| 7,089,849 B2 * | 8/2006 | Chen et al. .................... 99/290 |
| 2002/0170438 A1 * | 11/2002 | Liu .............................. 99/293 |

FOREIGN PATENT DOCUMENTS

EP    0 577 561 A1    1/1994

* cited by examiner

*Primary Examiner*—Tu B Hoang
*Assistant Examiner*—Brian Jennison
(74) *Attorney, Agent, or Firm*—Browdy and Neimark, PLLC

(57) ABSTRACT

A coffeemaker composed of: a plurality of infusion heads that can each receive a predetermined quantity of a product to be infused; a common hydraulic circuit including, connected in series: a water reservoir; a flow meter for measuring the rate of flow of water from said reservoir; a pump; a heater; and a plurality of parallel outlet tubes each connected to an outlet of the heater, the heater and the pump being operative to deliver water from the reservoir to the heater through the flow meter; a control unit connected to the flow meter and the pump being for controlling the operation of the coffeemaker; and distribution devices connected in series with each of the outlet tubes and connected to be controlled by the control unit for delivering water or steam to each of infusion head as a function of signals received from the flow meter.

23 Claims, 2 Drawing Sheets

COFFEEMAKER HAVING SEVERAL INFUSION HEADS

BACKGROUND OF THE INVENTION

The present invention relates to a coffeemaker adapted to prepare a hot beverage starting from a percolation or infusion product, loose, or in bulk, or contained in a prefabricated sachet, or packet, or pod, such as ground coffee, tea, chocolate or a soluble powder of coffee, milk, and/or chocolate. The invention concerns more particularly such a machine having several infusion or percolation heads that can function simultaneously or individually.

An appliance for the preparation and distribution of hot beverages generally comprises a cold water reservoir, an electric pump, an assembly forming a boiler, or water heater, and an infusion head that receives a filter holder containing the ground coffee, or other ground or powdered product, or that directly receives prefabricated sachets, packets, or other measures quantities of the product. The infusion head supplies hot water coming from the boiler, and the resulting beverage is then directed toward a collecting receptacle.

There is known in the art, particularly as disclosed in U.S. Pat. No. 5,259,297, the disclosure of which is incorporated herein by reference, a professional coffee maker adapted to prepare beverages of the espresso, cappuccino, or tea type by delivering hot water or steam toward several infusion heads. This machine comprises in particular a boiler supplied with water by a pump through a feed conduit to produce hot water or steam that flows via ducts, or nozzles, provided for this purpose. The machine also comprises several percolation devices whose hydraulic circuits are disposed in parallel on the cold water feed line for the machine. Each percolation device comprise its own pump, flow meter, and instantaneous heating element and a solenoid valve. The percolation heads are connected electrically to a common control unit. Due to the fact that it is provided with its own means for distribution of the desired quantity of water coming from a common water feed conduit, such a machine is able to furnish an accurately measured beverage for each percolation head, but at the price of considerable structural complexity, large size and high fabrication cost.

BRIEF SUMMARY OF THE INVENTION

The present invention seeks to overcome drawbacks of known machines by providing a coffeemaker having several infusion heads, or dispensing bodies, adapted to assure a precise distribution of a measured quantity of water for each infusion head, involving a minimum fabrication cost, and this particularly for a coffeemaker operating at a low pressure.

The invention also seeks to provide a coffeemaker having several infusion heads comprising control means adapted to better control the total quantity of water distributed, as well as the distribution of infusion water into each infusion head, in order to obtain the required quantity, or volume, of beverage in a cup, and to achieve this in a simple manner and in a manner that assures long term reliability.

Specifically, the invention provides a coffeemaker having several infusion heads that can each receive a predetermined quantity of the product to be infused, and a common hydraulic circuit having a water reservoir connected through a flow meter to a pump that delivers water from the reservoir into a heater having an outlet tube, the flow meter and the pump being connected to electronic means for controlling the operation of the machine. According to the invention, the outlet tube of the heater is divided into several parallel tubes provided to deliver the water to the infusion heads, each tube being connected to water distribution means controlled by said control means as a function of signals received from the flow meter.

Such a coffeemaker thus contains, preferably at the interior of a housing, or case, a common hydraulic circuit that supplies cold water from the reservoir to the heater of the machine. When the water in the heater has reached the desired operating temperature, the pump is placed into operation and delivers a certain quantity of water necessary for operation of the machine, which quantity of water is measured by the flow meter. The water passes through the heater and exits through several parallel tubes toward the infusion heads. The water distribution means according to embodiments of the invention, disposed between the common outlet tube of the heater and the inlet to each infusion head, are then controlled by the control means in order to allow passage of a predetermined quantity of water through each infusion head. The quantity of water that passes through the distribution means into each infusion head is measured by the same flow meter, the distribution means then operating to deliver the water in an alternating manner into each infusion head. The total quantity of water coming from the common hydraulic circuit is thus properly distributed among all of the infusion heads of the machine. When the information produced by the flow meter indicates that the desired total quantity of water has been delivered by the pump, the electronic control means of the machine turn the pump off.

Thus, with a common hydraulic circuit, but with distribution means individually controlled for each infusion head, it is possible to correctly distribute the total quantity of water delivered by the pump among the different infusion heads and, as a result, to obtain a correctly dosed quantity of beverage in each cup in a simple, reliable and inexpensive manner. This is all the more important in the context of a coffeemaker operating at low pressure which is more sensitive to pressure losses created when the machine delivers water at a pressure of around 2 bar through the product to be infused, which is present in the infusion head.

Embodiments of coffeemakers according to the invention can also serve to produce a single serving of coffee, when a single infusion head is activated, as well as to produce several servings, when several infusion heads, or all of the infusion heads, are activated simultaneously by the user.

In certain preferred embodiments of the invention, the coffeemaker contains two infusion heads.

This permits the production of either two identical beverages simultaneously, for example two cups of coffee in the case where two infusion products, for example contained in identical packets, or pods, have been placed in the two infusion heads, or a combined beverage by using two different packets, for example a packet of milk and a packet of coffee to obtain café au lait.

Preferably, the distribution means have at least one solenoid valve.

Solenoid valves, or electronically controlled valves, permit, based on simple electronic commands, the achievement of accurate distribution water in the channels, or tubes, at a minimal fabrication cost.

Preferably, each infusion head is connected to the outlet of the heater by a respective two-way electrically controlled valve.

According to a possible variation, use can be made of a three-way electronically controlled valve mounted on the outlet tube of the heater, the valve then being of the type having two control windings or one winding and a return spring. Preferably, however, two valves, each two-way, are preferred since this allows precise control of a single infusion head at a time, while assuring a simultaneous and continuous filling of two cups disposed side-by-side.

Advantageously, the electronically controlled valve is a direct acting valve and is closed when in its rest, or inactive, position.

Such an electronically controlled valve is preferred for economic reasons, since it consumes less energy.

Advantageously, the control means control the operation of the two valves in order to produce alternating opening and closing cycles with a time interval during which both valves are simultaneously closed.

When operating in this alternative manner, the electronic control can then control the operation of one valve at a time. It has, in effect, been found, during testing of embodiments of the invention, that there should be intervals during which both valves are closed in order to permit a correct reading of the output of the flow meter during alternative operation of two valves. Thus, by way of example, a simultaneous closing time of 0.1 sec is provided for both valves, and the opening time for each valve is of the order 0.5 sec in order to permit correct reading by the flow meter.

Preferably, the coffeemaker has means for producing steam to be delivered to at least one of the infusion heads.

The steam production means can be used for extraction from the infusion product or the pod containing the product with steam, or even to perform a cleaning of each infusion head at the end of a beverage preparation cycle.

Advantageously, the coffeemaker according to the invention has a pump operating at low pressure to deliver water through flexible pods, or packets, disposed in the infusion heads.

Solutions provided by the invention find their application above all in the context of a low pressure coffeemaker having a pump that produces a pressure of the order of 2 bar and which utilizes flexible pods, since the pressure losses vary considerably from one packet to another as a function of fabrication tolerance, this variation being very sensitive to operation of the pump in the low pressure range. It is thus necessary to assure that the quantity of water distributed into each infusion head is correct, regardless of the loss of pressure that the infusion head undergoes after the passage of the water through the pod, or packet, containing the infusion of product.

BRIEF DESCRIPTION OF THE DRAWING

The invention will be better understood from a study of the exemplary embodiments presented by way of non-limiting example and illustrated in the following attached figures.

DETAILED DESCRIPTION OF THE INVENTION

Figure 1:
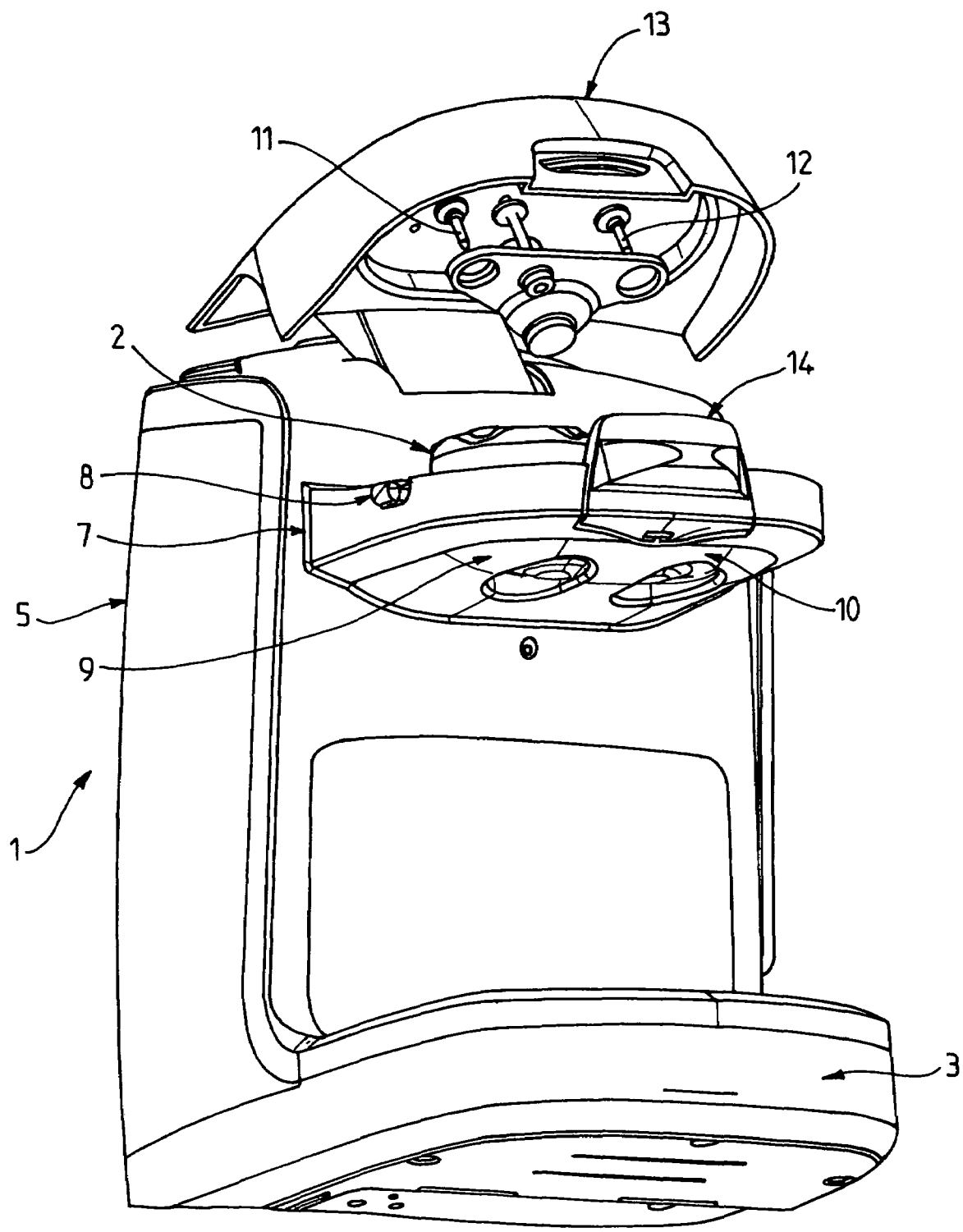
FIG. 1 is a perspective view of a coffeemaker according to one exemplarily embodiment of the invention.

FIG. 1 shows one embodiment of a coffeemaker according to the invention having a case 1 that includes a horizontal base 3 at the bottom and is completed by a vertical upright 5 at the rear of the machine. A horizontal platform 7 is fixed to, and extends forwardly from, upright 5 at a height permitting the positioning thereunder of a receptacle, such as a cup, tumbler, carafe, or coffeepot. The upper face of the front end of platform 7 has a hollow housing into which is installed a removable support 8 for receiving two packets, or pods, 2, only one of which is visible in FIG. 1, arranged side-by-side. Support 8 presents two recesses or vertical infusion heads 9 and 10 for reception and retention of pods 2 of the product to be infused.

Platform 7 is completed by two lateral uprights supporting in rotation a jaw 13 that carries tubes 11, 12 for supplying hot water, or steam, for infusion. The outlet ends tubes 11 and 12 can be provided with sprinkler or spray heads for diffusion of the hot water to be infused through the flexible pods, the infusion taking place in a sealed manner in each of the infusion heads. According to a possible variation, each tube can be connected to a needle provided with an infusion orifice and intended to perforate a pod, or packet, whose envelope is made of a rigid material. The resulting beverage then flows through an outlet tube (not shown) situated at the lower part of the infusion head. Jaw 13 is maintain closed in the lower position by a latching device 14.

A pod 2 is a flexible packet, slightly convex, formed of two sheets of filter paper joined together at the level of a peripheral sealing ring, or flange. The packet contains the product to be infused in the form of coffee grounds, tea, aromatic plants, or in the form of a powder of coffee, milk, chocolate, or a mixture thereof. According to one variant of the invention, the pod has a rigid envelope of plastic or aluminum associated with a filter or a screen. According to yet another variant, the product to be infused is loose and can be introduced directly into the interior of the cup forming the infusion head, the cup being furnished in this case with a filter wall at its lower part, above the orifice for delivery of the beverage toward a cup.

Figure 2:
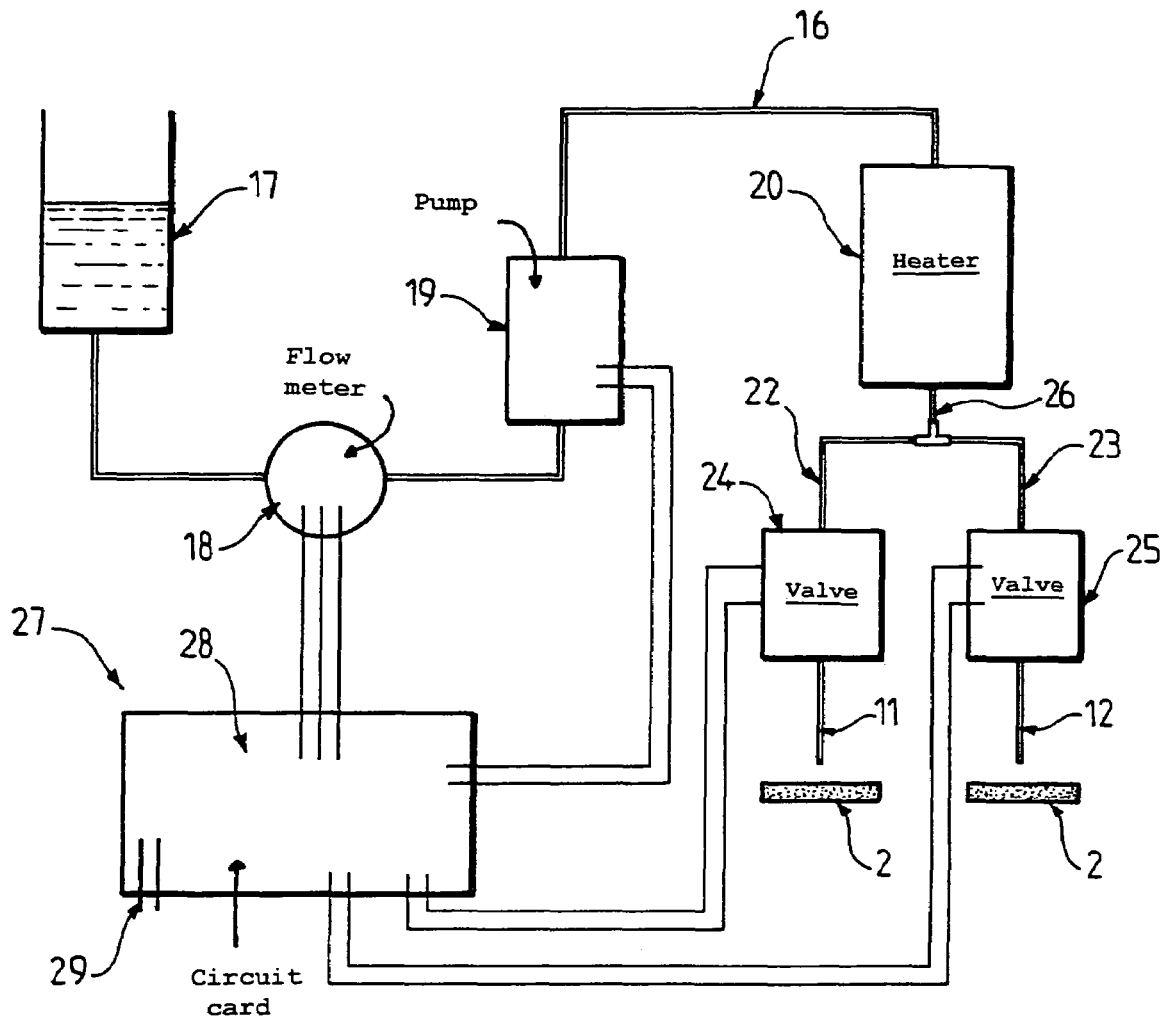
FIG. 2 is a schematic diagram showing the control components of a coffeemaker according to one embodiment of the invention.

Case 1 of the machine encloses a series hydraulic circuit having, as shown in FIG. 2, a cold water reservoir 17, a flow meter 18, a pump 19 and a heater, or boiler, 20 connected in series with pump 19 by a common conduit, or tube, 16. Water reservoir 17 is mounted to be removable from the case and has for this purpose a closing valve at the point where it is connected to the conduit of the case. Flow meter 18 contains, in a conventional manner, a turbine, or bladed wheel, that rotates in response to the flow rate of water passing through it when water is drawn by pump 19. Common pump outlet conduit 16 is connected to the inlet of heater 20, which contains, for example, water circulation channels in thermal contact with an electric heating element (not shown).

The coffeemaker also has electronic control means 27, particularly a circuit card 28 containing a power supply source 29. Electronic control means 27 control the operation of the coffeemaker as a function of flow rate signals received from flow meter 18, a temperature probe associated with heater 20 and inputs provided by a control panel (not shown).

According to the invention, a single outlet conduit, or tube 26 from heater 20 is divided into two parallel conduits 22 and 23 each in series with a respective electrically controlled valve 24, 25, each being a two-way valve. Valves 24, 25 are coupled to circuit card 28 and controlled by signals from that card, such as will be explained in greater detail below. Hot water under pressure distributed through valves 24, 25 arrives into supply tubes 11, 12, respectively, and then into infusion heads 9 and 10 through pods, or packets, 2.

All of the components described thus far can be constituted by components that are known in the art or that can be constructed based entirely on knowledge possessed by those of ordinary skill in the art.

In operation, the user begins by introducing a packet 2 into one of the heads or a respective one of two such packets into each of the two heads 9 and 10, then closes jaw 13 and operates a push button for starting the coffeemaker and supplying electric energy to the heating element of heater 20. When the assigned temperature is achieved in the heater, an indicator light indicates this to the user, who can then turn pump 19 on. At this moment, circuit card 28 controls the opening of one or the other, or both, valves 24, 25 depending on the mode of operation selected by the user, i.e. activating a single infusion head or activating both infusion heads at the same time.

In a first mode of operation where only one of the infusion heads, for example head 9, contains a packet 2 and where only this infusion head is activated by the user, operation of an infusion control push button by the user leads to, via control signals provided by card 28, the opening of valve 24 and the start of operation of pump 19. Flow meter 18 measures the flow rate received by pump 19 and delivers a series of measuring signal pulses to circuit card 28. Flow meter 18 also reads the flow rate of water delivered by valve 24. When the number of pulses corresponding to the desired quantity of beverage has been produced, the pump is automatically halted by control signals from card 28.

According to a second mode of operation, where the user introduces a respective packet 2 into each infusion head 9, 10 in order to obtain two beverages in respective cups below the infusion heads, action on the infusion control button causes, in response to signals from card 28, the opening of the two valves 24, 25 and starting of pump 19. Valves 24 and 25 function in an alternating manner, in that one valve is closed while the other valve is open, and thus the flow meter can measure the flow rate of water passing through one of the valves, while the other valve is closed. In order to have an exact measurement for each infusion head, the opening time of each valve is 0.5 sec during which flow meter 18 can correctly measure the flow rate of water distributed through each valve in turn. During the course of each operating cycle, both valves are closed for a period of around 0.1 sec to give the electronic circuitry time to react to signals from flow meter 18, and so that it can operate one valve at a time. Flow meter 18 continuously measures the flow rate through each tube 11,12 and sends the measuring pulses to card 28. When the total quantity of water distributed through valves 24 and 25 and measured by flow meter 18 is equal to the quantity of water selected by the user for each head (the quantity selected by the user can be different from one head to the other), circuit card 28 issues a signal to halt the operation of pump 19.

The machine according to the invention can equally produce steam, for example by reducing the flow rate of water delivered into heater 20 to a level that will cause all of the water to be vaporized. The flow of steam exiting through outlet conduit 26 of heater 20 is then distributed into one or the other of infusion heads 9, 10, in the same manner as described above, by operation of valves 24,25 controlled by circuit card 28. These valves thus control the precise moment at which steam is diffused into each of infusion heads 9, 10.

The flow of steam produced by the machine can then be used to clean the coffee passages, or to effect extraction of the product to be infused, or to produce a beverage such as cappuccino through a steam nozzle installed in one of the infusion heads, as is already known in the art for machines equipped to produce a beverage of that type.

Thus, distribution means according to embodiments of the invention permit accurate dosing of the quantity of beverage delivered into a cup, precise control of good distribution of the beverage into each cup, without being influenced by imbalances due to pressure losses in each infusion head, and equally accurate control of the precise moment of halting diffusion of steam when the steam function has been selected by the user.

According to one further variant that can be employed in embodiments of the invention, the two-way valves can be replaced by a single three-way electrically controlled valve having two solenoids or one solenoid and a return spring.

This application relates to subject matter disclosed in French Application number FR 05 04570, filed on May 4, 2005, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A coffeemaker comprising:
   a plurality of infusion heads that can each receive a predetermined quantity of a product to be infused;
   a common hydraulic circuit comprising, connected in series: a water reservoir; a flow meter for measuring the rate of flow of water from said reservoir; a pump; a heater; and a plurality of parallel outlet tubes each connected to an outlet of said heater, said pump being operative to deliver water from said reservoir to said heater and said flow meter being connected between said reservoir and said pump;
   control means connected to said flow meter and said pump for controlling the operation of said coffeemaker; and
   distribution means connected in series with each of said outlet tubes and connected to be controlled by said control means for delivering water or steam to each of said infusion heads as a function of signals received from said flow meter, wherein said flow meter is the only meter between said reservoir and said pump, and said outlet tubes are connected directly to said outlet of said heater.

2. The coffeemaker of claim 1, further comprising means for producing steam to be delivered to at least one of said infusion heads.

3. The coffeemaker of claim 1, wherein said pump is adapted to operate at low pressure to deliver water through a flexible packet disposed in at least one of said infusion heads.

4. The coffeemaker of claim 1, wherein said plurality of infusion heads consist of two infusion heads.

5. The coffeemaker of claim 4, further comprising means for producing steam to be delivered to at least one of said infusion heads.

6. The coffeemaker of claim 4, wherein said pump is adapted to operate at low pressure to deliver water through a flexible packet disposed in at least one of said infusion heads.

7. The coffeemaker of claim 4, wherein said distribution means comprise at least one electrically controlled valve.

8. The coffeemaker of claim 7, further comprising means for producing steam to be delivered to at least one of said infusion heads.

9. The coffeemaker of claim 7, wherein said pump is adapted to operate at low pressure to deliver water through a flexible packet disposed in at least one of said infusion heads.

10. The coffeemaker of claim 4, wherein said distribution means comprise two two-way electrically controlled valves each connected for delivering water or steam from said heater to a respective one of said infusion heads.

11. The coffeemaker of claim 10, further comprising means for producing steam to be delivered to at least one of said infusion heads.

12. The coffeemaker of claim 10, wherein said pump is adapted to operate at low pressure to deliver water through a flexible packet disposed in at least one of said infusion heads.

13. The coffeemaker of claim 10, wherein each of said valves is a direct acting valve having an inactive state in which said valve is closed.

14. The coffeemaker of claim 13, further comprising means for producing steam to be delivered to at least one of said infusion heads.

15. The coffeemaker of claim 13, wherein said pump is adapted to operate at low pressure to deliver water through a flexible packet disposed in at least one of said infusion heads.

16. The coffeemaker of claim 13, wherein said control means are operative to control the operation of said two valves in order to produce alternating opening and closing cycles with a time interval during which both valves are simultaneously closed.

17. The coffeemaker of claim 16, further comprising means for producing steam to be delivered to at least one of said infusion heads.

18. The coffeemaker of claim 16, wherein said pump is adapted to operate at low pressure to deliver water through a flexible packet disposed in at least one of said infusion heads.

19. The coffeemaker of claim 10 wherein said control means are operative to control the operation of said two valves in order to produce alternating opening and closing cycles with a time interval during which both valves are simultaneously closed.

20. The coffeemaker of claim 19, further comprising means for producing steam to be delivered to at least one of said infusion heads.

21. The coffeemaker of claim 19, wherein said pump is adapted to operate at low pressure to deliver water through a flexible packet disposed in at least one of said infusion heads.

22. The coffeemaker of claim 1, wherein said reservoir has a water outlet connected directly to a water inlet of said flow meter.

23. A coffeemaker comprising:
- a plurality of infusion heads that can each receive a predetermined quantity of a product to be infused;
- a common hydraulic circuit comprising, connected in series: a water reservoir; a flow meter for measuring the rate of flow of water from said reservoir; a pump; a heater; and a plurality of parallel outlet tubes each connected to an outlet of said heater, said pump being operative to deliver water from said reservoir to said heater and said flow meter being connected between said reservoir and said pump;
- control means connected to said flow meter and said pump for controlling the operation of said coffeemaker; and
- distribution means connected in series with each of said outlet tubes and connected to be controlled by said control means for delivering water or steam to each of said infusion heads as a function of signals received from said flow meter, wherein said flow meter is the only flow meter in said coffeemaker, and said outlet tubes are connected directly to said outlet of said heater.

* * * * *